United States Patent
Shin et al.

[11] Patent Number: 5,840,269
[45] Date of Patent: Nov. 24, 1998

[54] METHOD OF PREPARING A DOUBLE LAYERED NICKEL HYDROXIDE ACTIVE MATERIAL

[75] Inventors: Dong Yup Shin, Kyungki-do; Jin-kyung Kim; Yeong-chan Eun, both of Chungcheongnam-do, all of Rep. of Korea

[73] Assignee: Samsung Display Devices Co., Ltd., Suwon, Rep. of Korea

[21] Appl. No.: 994,259

[22] Filed: Dec. 19, 1997

[30] Foreign Application Priority Data

Aug. 4, 1997 [KR] Rep. of Korea ................. 1997-37201

[51] Int. Cl.$^6$ ............................. C01B 13/36; C01G 53/00
[52] U.S. Cl. ......................... 423/592; 429/223; 428/701
[58] Field of Search .................... 423/592, 594; 429/223; 427/126.6; 428/701, 702

[56] References Cited

U.S. PATENT DOCUMENTS 5,498,403  3/1996  Shin ........................................ 423/592
5,587,139  12/1996 Shin ........................................ 423/592
5,688,616  11/1997 Yamawaki et al. .................... 429/223
5,702,762  12/1997 Baba et al. ............................. 427/212

FOREIGN PATENT DOCUMENTS 6-191855  7/1994  Japan ..................................... 423/592
9531911  12/1995  Japan .

*Primary Examiner*—Steven Bos
*Attorney, Agent, or Firm*—Christie, Parker & Hale, LLP

[57] ABSTRACT

A method of preparing a double layered nickel hydroxide comprising the steps of spraying a first solution of nickel sulfate solution and aqueous ammonia into a first reaction bath, reacting the first solution with sodium hydroxide for a predetermined time to form a core of nickel hydroxide, injecting the core of nickel hydroxide into a second reaction bath, spraying a second solution of nickel sulfate and aqueous ammonia into the second reaction bath, reacting the second solution and sodium hydroxide with the core of nickel hydroxide and growing the core of nickel hydroxide to form an outer layer on the core of nickel hydroxide, the outer layer having a different physical property from the core, is provided.

12 Claims, 1 Drawing Sheet

METHOD OF PREPARING A DOUBLE LAYERED NICKEL HYDROXIDE ACTIVE MATERIAL

BACKGROUND OF THE INVENTION

1. Field of the Invention

The present invention relates to a method of preparing a nickel hydroxide active material for a nickel based cell, and, particularly, to a method of preparing an active material comprising a double layered nickel hydroxide with a core and an outer layer having different physical properties.

2. Description of the Related Art

The physical properties of nickel hydroxide used as a positive active material for a nickel based cell may be remarkably changed according to its method of preparation. Generally, nickel hydroxide is prepared by the neutralization method comprising the steps of mixing nickel salt and hydroxide salt and adding a trace of water to the mixture. The nickel hydroxide prepared by the neutralization method is a coarse particle having a diameter of 1 to several hundred $\mu$m, thus the particle should be ground to use as an active material for a cell. However, the ground particle has an irregular form and low density so that it is undesirable to use as an active material for a cell. Moreover, in case of neutralizing in an aqueous solution, because the reaction rate is very rapid, the active material particle has low density, and its size is miniscule. Therefore, it takes a long time to flitrate and wash the particle. Because the surface of the particle contains a large amount of water before drying, in preparing a paste, it is difficult to pack densely and the particle is severely separated from the plate.

In order to prepare a paste having a good fluidity, charge characteristic, charge rate, and discharge characteristic, one must use, as an active positive material, nickel hydroxide having high density, a globular form and a narrow particle diameter distribution. Namely, it is preferred that nickel hydroxide for a cell has an apparent density of 1.6 to 1.7 g/cm$^3$, a tapping density of 2.0 to 2.1 g/cm$^3$ and a particle diameter of 5 to 40/$\mu$m.

When nickel hydroxide should be gradually grown, nickel hydroxide having high density and a globular form as described above is prepared. In order to control the reaction rate, a complex of nickel ion and ammonia is formed and neutralized, or the nickel-ammonium complex ion is decomposed by increasing the solution temperature in preparing nickel hydroxide. The method as described above can prepare nickel hydroxide having a high density, but it is difficult to control the reaction rate and particle diameter and continuously prepare nickel hydroxide because the solution composition and pH are severely changed.

In a positive electrode of a nickel cell, in the form of paste, the major reason for the electrode inferiority is due to the swelling of the electrode by the expansion of the electrode volume, which happens when nickel hydroxide changes its form from $\beta$-NiOOH to $\gamma$-NiOOH having low density. The swelling of the electrode causes separation of the active material, decrease of conductivity, and severe decrease of the lifetime and efficiency of the electrode. The $\gamma$-NiOOH having a low density is formed due to the compact crystalline structure of $\beta$-nickel hydroxide having a high density. The compact crystalline structure results in the decrease of the number of internal micropores, thus hydrogen ions can not move smoothly in the crystalline structure. In current charging, due to high overvoltage, an electrical potential of the electrode is increased, thus $\beta$-NiOOH which is already charged is continuously oxidized and is changed to $\gamma$-NiOOH having low density and a higher oxidation number. When $\gamma$-NiOOH is formed, the volume of the active material is expanded which results in the swelling of the electrode. Furthermore, as charge-discharge is repeated, separation of the active material from the electrode occurs and conductivity of the electrode is severely deteriorated according to the volume change of the electrode, thus capacity of the cell is remarkably decreased. The phenomenon extremely occurs in a high rate charge-discharge.

In order to prevent the change of $\beta$-NiOOH to $\gamma$-NiOOH, an element such as cobalt, cadmium, zinc, et al. is added to nickel hydroxide. The method allows the distortion of a lattice by substituting the nickel with the element, thereby facilitating the transfer of hydrogen ions to decrease the overvoltage. Therefore, the method can effectively prevent the change of $\beta$-NiOOH to $\gamma$-NiOOH.

The method of adding an element such as cobalt, cadmium and zinc, et al. to nickel hydroxide is as follows (Korean patent Laid-open No. 95-31911). Firstly, a solution of nickel salt having cobalt or zinc, et al. and aqueous ammonia are mixed in a mixing bath, and the mixture and an aqueous sodium hydroxide are injected into a reaction bath, and then the mixture reacts with sodium hydroxide to prepare a precipitate of nickel hydroxide, as disclosed in Korea patent laid open No. 95-31911.

When the conductivity of nickel hydroxide prepared by adding an additive agent such as cobalt or zinc, et al., to nickel hydroxide, increases, oxygen evolution overpotential at the surface thereof increases. Therefore, when a positive electrode for a nickel cell is prepared by using the precipitated nickel hydroxide as described above, the utilization rate thereof is increased and the high rate charge-discharge characteristic is achieved.

However, the method has a disadvantage in that due to the substitution of nickel of the nickel hydroxide with an element such as cobalt or zinc, the content of nickel in the nickel hydroxide is decreased so that the theoretical capacity of the active material is decreased.

SUMMARY OF THE INVENTION

In order to solve this disadvantage, an object of the present invention is to provide a method of preparing a double layered nickel hydroxide by using a small amount of an additive agent such as cobalt or zinc, et al. and a method of preparing the double layered nickel hydroxide having a core and an outer layer having different physical properties without deteriorating the theoretical capacity thereof.

The further object of the present invention is to provide a method of preparing a positive electrode for a nickel based cell having a good utilization rate, an improvement of high-temperature performance and a high charge-discharge characteristic.

In order to achieve these objects, the present invention provides a method of preparing a double layered nickel hydroxide comprising a core and an outer layer having different physical properties comprising the steps of:

(1) spraying a mixture, which is prepared by mixing a first nickel sulfate solution and aqueous ammonia in a spraying tube, into a first reaction bath, (2) reacting the mixture with sodium hydroxide in the first reaction bath to prepare a core of nickel hydroxide, (3) injecting a solution comprising the core of nickel hydroxide into a second reaction bath, and (4) growing a nickel hydroxide outer layer on the core of nickel hydroxide in the second reaction bath in the presence of a second nickel sulfate solution, aqueous ammonia and sodium hydroxide. The outer layer has a different physical property from the core of nickel hydroxide.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly recited in the appended claims.

Figure 1:
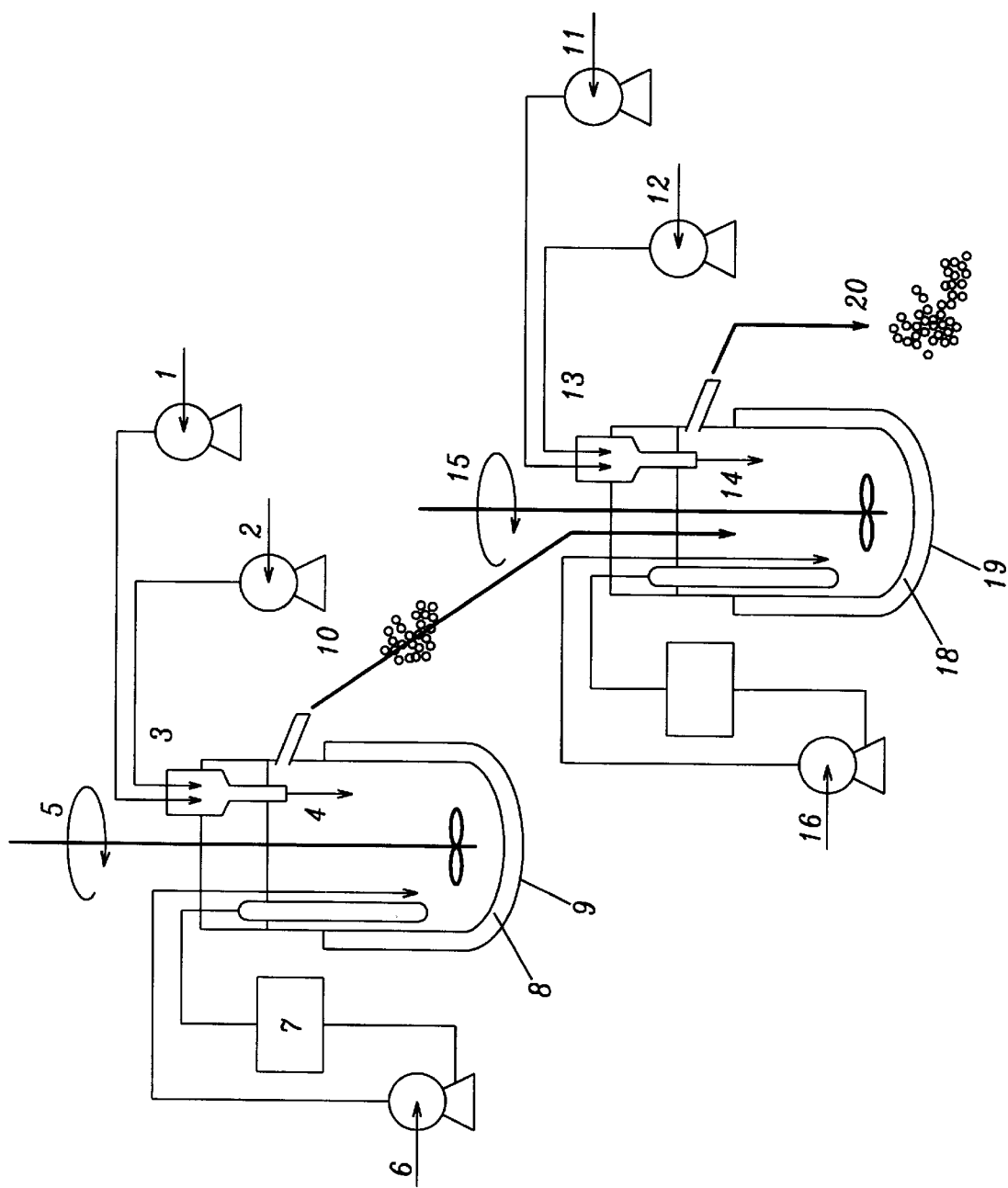
FIG. 1 is a schematic diagram showing an apparatus for preparing a double layered nickel hydroxide active material of the present invention.

In the following detailed description, only the preferred embodiment of the invention has been shown and described, simply by way of illustration of the best mode contemplated by the inventor(s) of carrying out this invention. As will be realized, the invention is capable of modification in various obvious respects, all without departing from the scope of the invention. Accordingly, the drawing and description are to be regarded as illustrative in nature, and not as restrictive.

DETAILED DESCRIPTION OF THE PREFERRED EMBODIMENTS

The present invention provides a method of preparing a double layered nickel hydroxide comprising a core and an outer layer having different physical properties comprising the steps of:

(1) spraying a mixture, which is prepared by mixing a first nickel sulfate solution and aqueous ammonia in a spraying tube, into a first reaction bath, (2) reacting the mixture with sodium hydroxide in the first reaction bath to prepare a core of nickel hydroxide, (3) injecting a solution comprising the core of nickel hydroxide into a second reaction bath, and (4) growing a nickel hydroxide outer layer on the core of nickel hydroxide in the second reaction bath in the presence of a second nickel sulfate solution, aqueous ammonia and sodium hydroxide. The outer layer has a different physical property from the core of nickel hydroxide.

In the present invention, the first and second nickel sulfate solution comprise 0.02 to 2.8 mol/liter of at least one element selected from the group consisting of bivalent metals, such as cobalt, cadmium, zinc, calcium and magnesium, et al., and non-metals, such as boron.

The method of preparing nickel hydroxide having a double layer with a different physical property between the core and the outer layer of this invention is illustrated in more detail with reference to FIG. 1.

The first step for preparing a nickel hydroxide is as follows:

While nickel sulfate solution (1) and aqueous ammonia (2) are added to the spraying tube (3) which is maintained at a constant temperature by a temperature controller (8) at a fixed rate and mixed, the mixture (4) is sprayed into the first reaction bath (9) which is maintained at the same temperature as the spraying tube. Sodium hydroxide solution (6) is. then added to the first reaction bath (9), and reacted with the mixture (4) by using the stirrer (5) to prepare a core of nickel hydroxide (10) of a double layered nickel hydroxide. In the manufacturing process, an amount of sodium hydroxide solution (6) to be added is automatically controlled by using a pH controller (7) so as to maintain the solution at a constant pH.

The second step for preparing the nickel hydroxide is as follows:

Thereafter, a solution comprising the core of nickel hydroxide (10) is automatically injected into a second reaction bath (19). While nickel sulfate solution (11) and aqueous ammonia (12) are injected into a spraying tube (13) which is maintained at a constant temperature by the temperature controller (18) at a fixed rate and while mixing, the mixture (14) is sprayed on the second reaction bath (19) which is maintained at the same temperature as the spraying tube by the temperature controller (18). Sodium hydroxide solution (16) is added to the second reaction bath (19) and reacted with the sprayed mixture (14) with shaker (15) to form an outer layer of nickel hydroxide on the core of nickel hydroxide (10), the outer layer having a different physical property from the core of nickel hydroxide (10), thus creating a double layered nickel hydroxide. An amount of sodium hydroxide (16) to be added is automatically controlled by the pH controller (17) so as to maintain the solution at a constant pH.

The aqueous solution of nickel sulfate solution (1) in the first step and nickel sulfate solution (13) in the second step comprise nickel sulfate as a main component and at least one element selected from the group consisting of bivalent metals, such as cobalt, cadmium, calcium, zinc and magnesium, and non-metals, such as boron, although the amount of the element to be added in the first and second steps is different. The preferred concentration of nickel in the nickel sulfate solution is 2.0 to 2.8 mol/liter. When the concentration of nickel sulfate is under this range, the amount of the solution to be treated is too large. Furthermore, when the concentration of nickel hydroxide exceeds this range, nickel sulfate salt easily precipitates.

Preferably, the nickel sulfate (1) used in the first step includes 0.02 to 0.2 mol/liter of at least one element which is selected from the group of cobalt, cadmium, zinc, calcium and magnesium, and the nickel sulfate (11) used in the second process includes 0.02 to 2.8 mol/liter of the at least one element. When an amount of the metal to be added is out of the range, the effect of the element upon characteristic of a positive electrode is not realized.

In the method, the concentration of ammonia in the aqueous ammonia (2, 12) is preferably 12.0 to 16.0 mol/liter.

The preferred concentration of sodium hydroxide (6, 16) is 5.0 to 8.0 mol/liter. When the concentration thereof exceeds this range, the physical property of nickel changes according to a partial change of the pH of the sodium hydroxide solution.

The mixing ratio of aqueous ammonia (2, 12) with nickel sulfate solution (1, 11) is 0.3 to 1.5 mole per 1 mole of nickel. When this ratio is below this range, it is difficult to form a complex of nickel ion and ammonia, and when this ratio is above this range, the yield decreases.

Furthermore, the mixing ratio of each of the mixture solutions (4, 14) and sodium hyaroxide (6, 16) is automatically controlled by using the pH controller (17) to obtain the ratio of from 1.9 to 2.3 mole of hydroxyl group per 1 mole of nickel. Because the physical property of nickel hydroxide is remarkably changed according to a change in pH, a constant pH in the reaction bath (9, 19) should be maintained.

The pH of the solution in the reaction bath is from 11 to 13 with a deviation ±0.1. When the pH is out of this range, the particle is fine and the density of the particle decreases.

The temperatures of the spraying tubes (3, 13) and the reaction baths (9, 19) are maintained within 35° to 70° C. to control the reaction rates and stabilize the solutions. When the temperature is below this range, precipitation easily occurs in forming an ammonium complex ion, and when the temperature is above this range, a large amount of ammonia vaporizes so that it is easy to unstabilize the solution.

The preferred reaction time in the first reaction bath (9) is from 2.5 to 6 hours to control the size of the particles and in the second reaction bath (19) is from 5 to 30 minutes. When the reaction times are above these ranges, the sizes of the particles are too large.

Nickel hydroxide prepared by the method of this invention has an apparent density of from 1.6 to 1.8 g/cm$^3$ and a tapping density of from 2.0 to 2.3 g/cm$^3$, in other words, a powder having a high density. In preparing the nickel positive electrode by using nickel hydroxide of this invention, the packing amount of the active material can be increased, and fluidity and packing characteristics can be improved due to a globular particle shape. Namely, the nickel positive electrode can be prepared by ussng nickel hydroxide ot this invention. Furthermore, the nickel positive electrode having a good utilization, an improvemept of high-temperature performance and an improvement of a high-rate charge-discharge characteristic can be prepared. Therefore, the present invention is applicable yo all industries that use a secondary cell having a positive electrode such as a nickel-metal hydride battery, a nickel-cadmium battery, a nickel-iron battery and a nickel-zinc battery.

The present invention is further explained in more details with reference to the following example which are within the scope of this invention.

EXAMPLE 1

First Step 2.3 mole of nickel sulfate solution, having 0.05 mole of cobalt and 0.05 mole of zinc, and 15 mole of aqueous ammonia were injected into a spraying tube maintained at a temperature of 50° C. at a rate of 0.55 mole of ammonia per 1 mole of nickel and mixed. While the mixture was sprayed into the first reaction bath, maintained at a temperature of 50° C., sodium hydroxide solution was added to the first reaction bath to prepare a core of nickel hydroxide of a double layered nickel hydroxide.

Second Step

The resulting product comprising the core of nickel hydroxide was injected into the second reaction bath maintained at a temperature of 50° C. Thereafter, 2.3 mole of nickel sulfate comprising 0.36 mole of cobalt and 0.05 mole of zinc and 15 mole of aqueous ammonia were injected into a spraying tube at a rate of 0.75 mole of ammonia per 1 mole of nickel and mixed. The mixture was sprayed into the second reaction bath to prepare a double layered nickel hydroxide having a higher cobalt content on the outer layer of nickel hydroxide than that of the core of nickel hydroxide.

The reaction times for the first step and the second step were 3 hours and 10 minutes, respectively.

The physical properties of the double layered nickel hydroxide prepared by this example were determined and the results thereof are shown in the following Table 1.

TABLE 1

|  | Core layer of nickel hydroxide (produced by the first step) | Outer layer of nickel hydroxide (produced by the second step) | A double layered nickel hydroxide |
| --- | --- | --- | --- |
| Apparent density | 1.72 g/cm$^3$ | — | 1.65 g/cm$^3$ |
| Tapping density | 2.20 g/cm$^3$ | — | 2.12 g/cm$^3$ |
| Average diameter | 2–25 μm | — | 2–34 μm |
| Composition | Co 1.4 wt % | Co 10.5 wt % | Co 1.9 wt % |
|  | Zn 1.5 wt % | Zn 1.5 wt % | Zn 1.5 wt % |

EXAMPLE 2

First Step 2.3 mole of nickel sulfate solution, having 0.05 mole of cobalt and 0.05 mole of zinc, and 15 mole of aqueous ammonia were injected into a spraying tube maintained at a temperature of 50° C. at a rate of 0.55 mole of ammonia per 1 mole of nickel and mixed. While the mixture was sprayed into the first reaction bath, maintained at a temperature of 50° C., sodium hydroxide was added to the first reaction bath the to prepare a core of nickel hydroxide of a double layered nickel hydroxide.

Second Step

The resulting product comprising the core of nickel hydroxide was injected into the second reaction bath maintained at a temperature of 50° C. Thereafter, 2.3 mole of nickel sulfate comprising 1.1 mole of cobalt and 0.05 mole of zinc and 15 mole of aqueous ammonia were injected into a spraying tube at a rate of 0.75 mole of ammonia per 1 mole of nickel and mixed. The mixture was sprayed into the second reaction bath to prepare a double layered nickel hydroxide having a higher cobalt content on the outer layer of nickel hydroxide than that of the core of nickel hydroxide.

The reaction times for the first step and the second step were 3 hours and 10 minutes, respectively.

The physical properties of the double layered nickel hydroxide prepared by this example were determined and the results thereof are shown in the following Table 2.

TABLE 2

|  | Core of nickel hydroxide (produced by the first step) | Outer layer of nickel hydroxide (produced by the second step) | A double layered nickel hydroxide |
| --- | --- | --- | --- |
| Apparent density | 1.72 g/cm$^3$ | — | 1.65 g/cm$^3$ |
| Tapping density | 2.20 g/cm$^3$ | — | 2.12 g/cm$^3$ |
| Average diameter | 2–25 μm | — | 2–34 μm |
| Composition | Co 1.4 wt % | Co 28.7 wt % | Co 2.9 wt % |
|  | Zn 1.5 wt % | Zn 1.6 wt % | Zn 1.5 wt % |

EXAMPLE 3

First Step 2.5 mole of nickel sulfate solution, having 0.04 mole of cobalt and 0.04 mole of zinc, and 15 mole of aqueous ammonia were injected into a spraying tube maintained at a temperature of 50° C. at a rate of 0.55 mole of ammonia per 1 mole of nickel and mixed. While the mixture was sprayed into the first reaction bath, maintained at a temperature of 50° C., sodium hydroxide solution was added to the first reaction bath to prepare a core of nickel hydroxide of a double layered nickel hydroxide.

Second Step

The resulting product comprising the core of nickel hydroxide was injected into the second reaction bath maintained at a temperature of 50° C. Thereafter, 2.5 mole of nickel sulfate comprising 1.18 mole of cobalt and 0.04 mole of zinc and 15 mole of aqueous ammonia were injected into a spraying tube at a rate of 0.8 mole of ammonia per 1 mole of nickel and mixed. The mixture was sprayed into the second reaction bath to prepare a double layered nickel hydroxide having a higher cobalt content on the outer layer of nickel hydroxide than that of the core of nickel hydroxide.

The reaction times for the first step and the second step were 3 hours and 10 minutes, respectively.

The physical properties of the double layered nickel hydroxide prepared by this example were determined and the results thereof are shown in the following Table 3.

TABLE 3

| | Core of nickel hydroxide (produced by the first step) | Outer layer of nickel hydroxide (produced by the second step) | A double layered nickel hydroxide |
|---|---|---|---|
| Apparent density | 1.72 g/cm$^3$ | — | 1.65 g/cm$^3$ |
| Tapping density | 2.26 g/cm$^3$ | — | 2.14 g/cm$^3$ |
| Average diameter | 2–30 µm | — | 2–40 µm |
| Composition | Co 0.9 wt % | Co 31.2 wt % | Co 2.6 wt % |
| | Zn 1.0 wt % | Zn 1.1 wt % | Zn 1.0 wt % |

EXAMPLE 4

First Step 2.5 mole of nickel sulfate solution, having 0.04 mole of cobalt and 0.04 mole of zinc, and 15 mole of aqueous ammonia were injected into a spraying tube maintained at a temperature of 50° C. at a rate of 0.6 mole of ammonia per 1 mole of nickel and mixed. While the mixture was sprayed into the first reaction bath, maintained at a temperature of 50° C., sodium hydroxide solution was added to the first reaction bath to prepare a core of nickel hydroxide of a double layered nickel hydroxide.

Second Step

The resulting product comprising a core of nickel hydroxide was injected into the second reaction bath maintained at a temperature of 50° C. Thereafter, 2.5 mole of nickel sulfate comprising 2.0 mole of cobalt and 0.04 mole of zinc and 15 mole of aqueous ammonia were injeted into a spraying tube at a rate of 0.8 mole of ammonia per 1 mole of nickel and mixed. The mixture was sprayed into the second reaction bath to prepare a double layered nickel hydroxide having a higher cobalt content on the outer layer of nickel hydroxide than that of the core of nickel hydroxide.

The reaction times for the first step and the second step were 3 hours and 10 minutes, respectively.

The physical properties of the double layered nickel hydroxide prepared by this example were determined and the results thereof are shown in the following Table 4.

TABLE 4

| | Core of nickel hydroxide (produced by the first step) | Outer layer of nickel hydroxide (produced by the second step) | A double layered nickel hydroxide |
|---|---|---|---|
| Apparent density | 1.75 g/cm$^3$ | — | 1.65 g/cm$^3$ |
| Tapping density | 2.26 g/cm$^3$ | — | 2.12 g/cm$^3$ |
| Average diameter | 2–30 µm | — | 2–34 µm |
| Composition | Co 0.9 wt % | Co 47.5 wt % | Co 3.6 wt % |
| | Zn 1.0 wt % | Zn 0.9 wt % | Zn 1.0 wt % |

The double layered nickel hydroxide prepared by the examples has an apparent density of 1.6 to 1.8 g/cm$^3$ and a tapping density of 2.0 to 2.3 g/cm$^3$, in other words, the double layered nickel hydroxide has high density. When the nickel positive electrode is prepared by using the double layered nickel hydroxide, fluidity and packing property of the active material is improved so that the positive electrode for a nickel based cell having high capacity can be prepared. Furthermore, the nickel positive electrode having a good utilization, an improvement of high-temperature performance and an improved high-rate charge-discharge characteristic can be prepared. Therefore, this invention is applicable to all industries that use secondary cells having a positive electrode for a nickel based cell such as a nickel-metal hydride battery, a nickel-cadmium battery, a nickel-iron battery and a nickel-zinc battery.

In the disclosure, there is shown and described only the preferred embodiments of the invention, but, as aforementioned, it is to be understood that the invention is capable of use in various combinations and environments and is capable of changes or modifications within the scope of the inventive concepts as expressed herein.

What is claimed is:

1. A method of preparing a double layered active material of nickel hydroxide comprising the steps of:

(1) spraying a first solution comprising nickel sulfate solution and aqueous ammonia into a first reaction bath into which sodium hydroxide solution is injected;

(2) reacting said first solution with sodium hydroxide for a time sufficient to form a core of nickel hydroxide;

(3) injecting said core of nickel hydroxide into a second reaction bath into which sodium hydroxide is injected;

(4) spraying a second solution comprising nickel sulfate solution and aqueous ammonia into said second reaction bath; and (5) reacting said second solution and sodium hydroxide with said core of nickel hydroxide and growing an outer layer on said core of nickel hydroxide, said outer layer having a different physical property from said core of nickel hydroxide.

2. The method as claimed in claim 1, wherein the concentration of nickel in the nickel sulfate solution is 2.0 to 2.8 mol/liter.

3. The method as claimed in claim 1, wherein the nickel sulfate solution comprises from 0.02 to 0.2 mol/liter of at least one element selected from the group consisting of cobalt, cadmium, zinc, calcium, magnesium and boron.

4. The method as claimed in claim 1, wherein the nickel sulfate solution comprises from 0.2 to 2.8 mol/liter of at least one element selected from the group consisting of cobalt, cadmium, zinc, calcium, magnesium and boron.

5. The method as claimed in claim 1, wherein the concentration of ammonia in the aqueous ammonia is from 12.0 to 16.0 mol/liter.

6. The method as claimed in claim 1, wherein the concentration of sodium hydroxide solution is from 5.0 to 8.0 mol/liter.

7. The method as claimed in claim 1, wherein the mixing ratio of nickel sulfate solution and aqueous ammonia is from 0.3 to 1.5 mole of ammonia per 1 mole of nickel.

8. The method as claimed in claim 1, wherein the first and second reaction baths are maintained at a temperature of from 35° to 70° C.

9. The method as claimed in claim 1, wherein the first and second reaction baths are maintained at a pH of from 11 to 13.

10. The method as claimed in claim 1, wherein the mixing ratio of the first solution and the sodium hydroxide solution is from 1.9 to 2.3 mole of hydroxyl group per 1 mole of nickel.

11. The method as claimed in claim 1, wherein the reaction time in the first reaction bath is from 2.5 to 6 hours.

12. The method as claimed in claim 1, wherein the reaction time in the second reaction bath is from 5 to 30 minutes.

* * * * *